(12) United States Patent
Nemedi

(10) Patent No.: US 6,742,731 B2
(45) Date of Patent: Jun. 1, 2004

(54) SYSTEM AND METHOD OF SHREDDING WET CHIPS IN A FLUME

(75) Inventor: William D. Nemedi, Paw Paw, MI (US)

(73) Assignee: Inter-Source Recovery Systems, Kalamazoo, MI (US)

( * ) Notice: Subject to any disclaimer, the term of this patent is extended or adjusted under 35 U.S.C. 154(b) by 93 days.

(21) Appl. No.: 10/100,786

(22) Filed: Mar. 19, 2002

(65) Prior Publication Data

US 2003/0178518 A1 Sep. 25, 2003

(51) Int. Cl.⁷ .............................................. B02C 19/12
(52) U.S. Cl. ........................ 241/21; 241/46.06; 241/243
(58) Field of Search .......................... 241/46.06, 46.08, 241/21, 243, 261

(56) References Cited

U.S. PATENT DOCUMENTS

| | | | |
|---|---|---|---|
| 3,960,335 A | 6/1976 | Häberle ...................... 241/236 |
| 4,000,858 A | * 1/1977 | Rudzinski .................... 241/27 |
| 4,186,888 A | * 2/1980 | Galanty ................... 241/46.06 |
| 4,377,259 A | * 3/1983 | Areaux et al. ................. 241/73 |
| 4,424,891 A | 1/1984 | Dudley et al. .................. 193/2 |
| 4,629,134 A | 12/1986 | Pennekamp ................... 241/87 |
| 4,691,871 A | 9/1987 | Mochizuki .................. 241/166 |
| 4,936,822 A | 6/1990 | Nemedi |
| 5,106,487 A | 4/1992 | Nemedi |
| 5,110,060 A | 5/1992 | Lundquist ................... 241/158 |
| 5,135,178 A | 8/1992 | Strohmeyer ................. 241/295 |
| 5,236,139 A | 8/1993 | Radtke ........................ 241/236 |
| 5,252,208 A | 10/1993 | Nemedi |
| 5,264,124 A | 11/1993 | Nemedi |
| 5,275,727 A | 1/1994 | Nemedi |
| 5,330,637 A | 7/1994 | Nemedi |
| 5,345,665 A | 9/1994 | Nemedi |
| 5,383,941 A | 1/1995 | Nemedi |
| RE35,307 E | 7/1996 | Nemedi |
| 5,944,992 A | 8/1999 | Nemedi |
| 6,125,992 A | * 10/2000 | Dudley ........................ 198/741 |
| 6,126,099 A | * 10/2000 | Fachinger et al. ............. 241/81 |
| 6,129,851 A | 10/2000 | Nemedi et al. |
| 6,253,929 B1 | 7/2001 | Nemedi et al. |
| 6,375,841 B1 | 4/2002 | Nemedi et al. |
| 6,405,877 B1 | 6/2002 | Nemedi et al. ............. 210/498 |
| 6,540,087 B2 | 4/2003 | Nemedi et al. ............. 209/146 |
| 6,572,779 B2 | 6/2003 | Nemedi et al. ............. 210/787 |
| 6,598,816 B1 | * 7/2003 | Lenhart et al. .......... 241/260.1 |

OTHER PUBLICATIONS

Chip Processing (Brochure), Inter–Source Recovery Systems, Inc., (circa 1999).

"Two–Stage Scrap Metal Shredder," Ser. No. 08/785,646, (filed 1997 –abandoned).

"Apparatus and Method For Shredding Wet Chip Materials," Ser. No. 10/611,526 (filed 2003 –pending).

* cited by examiner

*Primary Examiner*—Mark Rosenbaum
(74) *Attorney, Agent, or Firm*—Marshall, Gerstein & Borun LLP

(57) ABSTRACT

A shredder system and method in which wet chips travel in a flume. The wet chips in a fluid transport travel in a trough to a shredder having a shredder assembly made up of a plurality of combs that cooperate with a plurality of sizing members with at least a portion of the combs and members being positioned within the trough. The trough preferably is located above ground and the wet chips can be shredded in the trough without removal of the wet chips form the trough.

16 Claims, 7 Drawing Sheets

SYSTEM AND METHOD OF SHREDDING WET CHIPS IN A FLUME

FIELD OF INVENTION

The invention is directed to a system for shredding scrap materials located in a flume.

DESCRIPTION OF RELATED TECHNOLOGY

In the course of a machine operation, scrap material, generally in the form of helical or other shaped metal chips are generated. The chips, referred to as wet chips, also are coated with a lubricant that is applied to the metal material during the course of a machining operation. Often, it is required to transport the scrap material from one or more machine locations to a shredder station where undesired bales of scrap material or other undesired large pieces of material are shredded. Following shredding, the scrap material or wet chips pass to a chip processing system where the wet chips are centrifuged during which lubricant is separated from the chips. The separated fluid is recaptured while the dry chips are blown to a dry chip container or collection site.

There are various systems for conveying wet chip material from a machine center (a center generally comprising one or more machine stations). In some instances, mechanical conveyors are utilized to transport the scrap material from a machine center to a shredder. In other instances, important to the present invention, the scrap material is transported in a flume from the machine center to a shredder. A flume is defined as a fluid or liquid conveyor system in which wet chips are transported through a fluid flow to at least a shredder station.

Heretofore, systems incorporating a flume as a means for conveying wet chips, employed a trough disposed in the floor of a building or structure. Liquid coolant was pumped through the trough. As wet chips passed from a machine discharge chute into the trough, they mixed with the liquid and were pumped along the length of the trough to a receiving tank. There the wet chips would drop on to a conventional drag filter mechanical conveyor partially disposed in the tank. The wet chips would be mechanically conveyed to a wet chip centrifugal separator processing system where fluid would be removed from the chips and recirculated back into the system while dry chips would be directed to a dry chip collection.

While this wet chip transport system is satisfactory for a number of applications, it is not particularly suitable in all instances. In some situations, it is not desired or convenient to place a trough in the floor of a building. It has been found that environmental concerns exist in properly maintaining unwanted debris from building up in the trough. Further, once a trough is formed in a flume transport system, it becomes more difficult to later relocate a machine center or flume transport.

Further, it has been found that, in some instances, as the wet chips travel in the flume, helical scrap pieces intertwine with one another forming bales of material. The bales can clog the pump which pumps the liquid and wet chips in the flume generally at a rate of about five to ten feet per second. Accordingly, a shredder is incorporated in the system ahead of the pump station for the purpose of shredding wet chip bales and any other undesired material into smaller pieces. Previously, the shredder was positioned at a location outside the trough. The wet chips would enter the shredder and, following a shredding operation, shredded wet chips were dropped or reintroduced into the flume and thereafter transported to the chip processing or other workstation(s).

What is desired is to have a wet chip transport system in which the flume is not located in the floor of a structure. Rather, the trough is positioned above ground so that, if necessary, the trough can be disassembled and a new trough positioned as desired thereby allowing flexibility in locating wet chip flume systems.

Additionally, it is desired to have a shredder assembly disposed directly in the trough path in order that wet chips need not be diverted from the flume. It is desired to have the wet chips in the flume pass directly into a shredder without the wet chips having to be removed from the liquid containing trough for shredding purposes.

SUMMARY OF INVENTION

The invention disclosed and claimed herein serves to obviate the above identified problems and achieve the above stated desires while at the same time achieving proper wet chip flow in the flume. Shredding of wet chips can occur without removing wet chips or bales of wet chips from the flume during shredding. The shredder is positioned within the trough whereby bales of wet chips or other unwanted large metal pieces pass through the shredder whose shredding mechanism is at least partially disposed in and traverses the trough. Further, the trough containing the fluid coolant preferably is positioned above ground.

These and other features, advantages, and objects of the present invention will be further understood and appreciated by those skilled in the art by reference to the following specification, drawings and claims.

DETAILED DESCRIPTION

Figure 1:
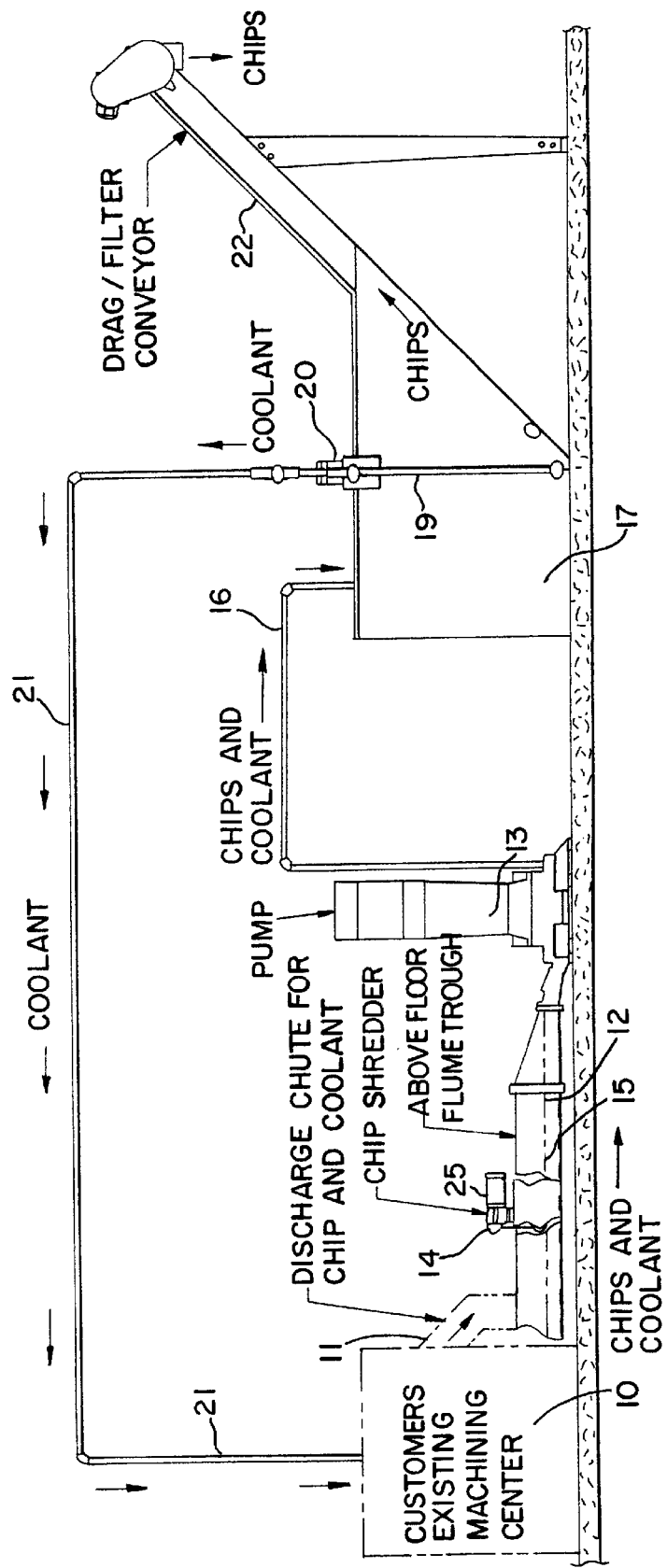
FIG. 1 shows a schematic elevation view of a first embodiment of a shredder assembly disposed in a trough of a flume system of the present invention.

Referring to the drawings, FIG. 1 illustrates a schematic view of a machine center 10 where wet chips are generated by a lathe or other type of metal working machine. Wet chips pass from the machine center through discharge chute 11 where the wet chips drop into a trough 12 containing liquid coolant. The wet chips along with coolant fluid disposed in trough 12 travel along the length of trough 12, the wet chips and fluid being pumped along in the direction of the longitudinal axis of the trough by means of a conventional pump assembly 13.

Prior to the wet chips entering pump assembly 13, the wet chips pass through shredder 14, which has a shredder assembly 15, at least a portion of which is disposed in the trough. As wet chips, which sometimes cling together in the form of stringy bales, pass into shredder assembly 15, the wet chips or bales thereof, as well as other unwanted metal objects, are shredded into individual wet chip pieces which are capable of passing through pump assembly 13.

Upon exiting shredder assembly 15, the shredded wet chips pass through pump assembly 13 where the wet chips and coolant then are pumped through conduit 16 into collection tank 17. Here the coolant fluid is recovered as the coolant passes into conduit 19. The coolant is pumped through pump assembly 20 into coolant conduit 21 where it then is recovered either at machine center 10 for reuse as a coolant or in a suitable collection tank, not shown. The shredded wet chips are conveyed by means of a suitable mechanical conveyor 22, such as a drag/filter conveyor, into a conventional parts separator and centrifugal separator, neither of which is shown.

Figure 2:
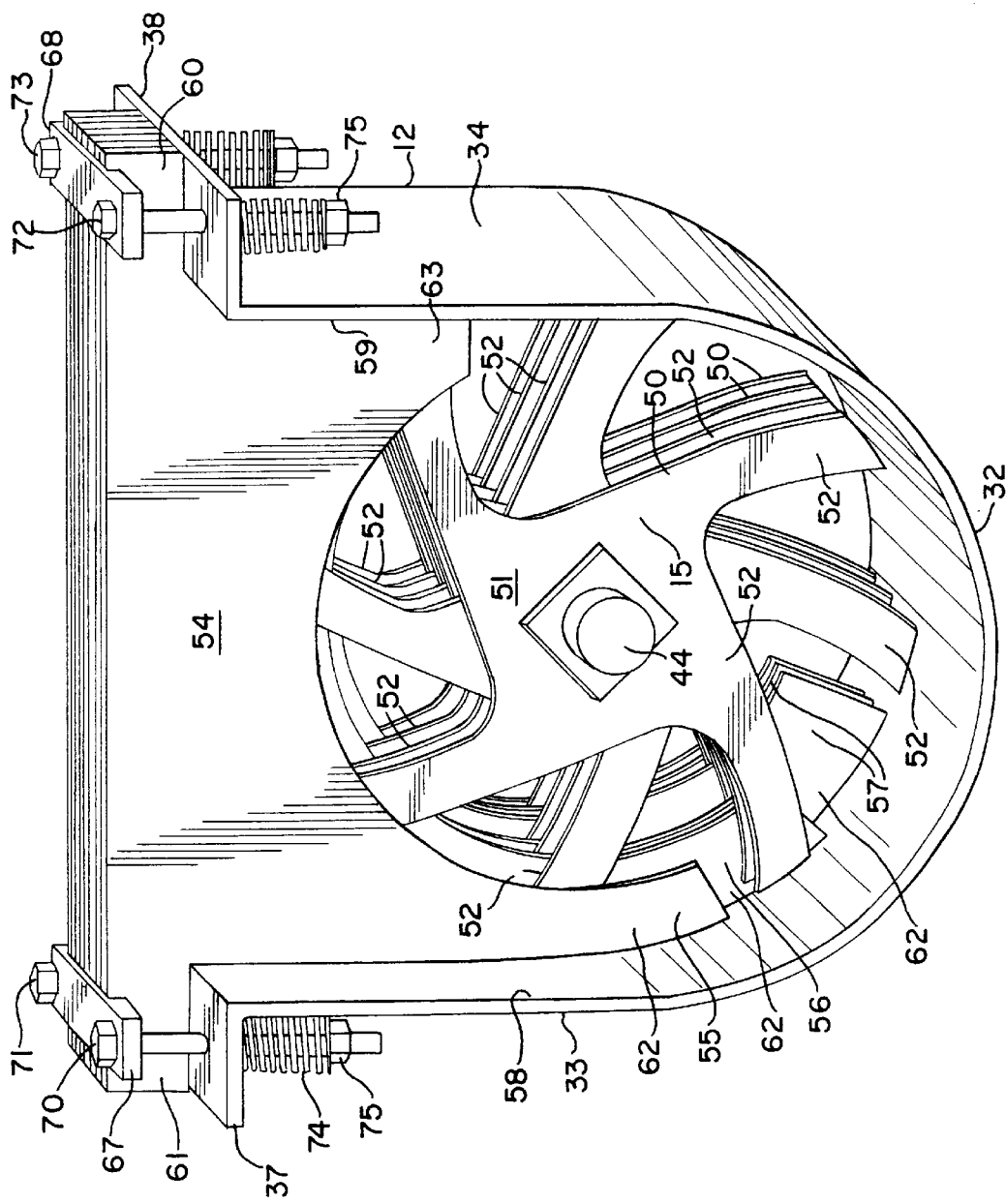
FIG. 2 shows a partial perspective view of the embodiment of FIG. 1 with the combs and sizing members of the shredder disposed in a trough of the present invention and the shredder shaft is positioned substantially parallel to the longitudinal axis of the trough in an inline position with the fluid/material flow.

FIG. 2 illustrates shredder assembly 15 disposed within trough 12 so that as the wet chips travel along trough 12, they will automatically engage shredder assembly 15. In this manner, any wet chips which have formed into bales or the like will pass through shredder assembly 15 without need of removing the wet chips or bales thereof from the trough for shredding purposes.

Figure 3:
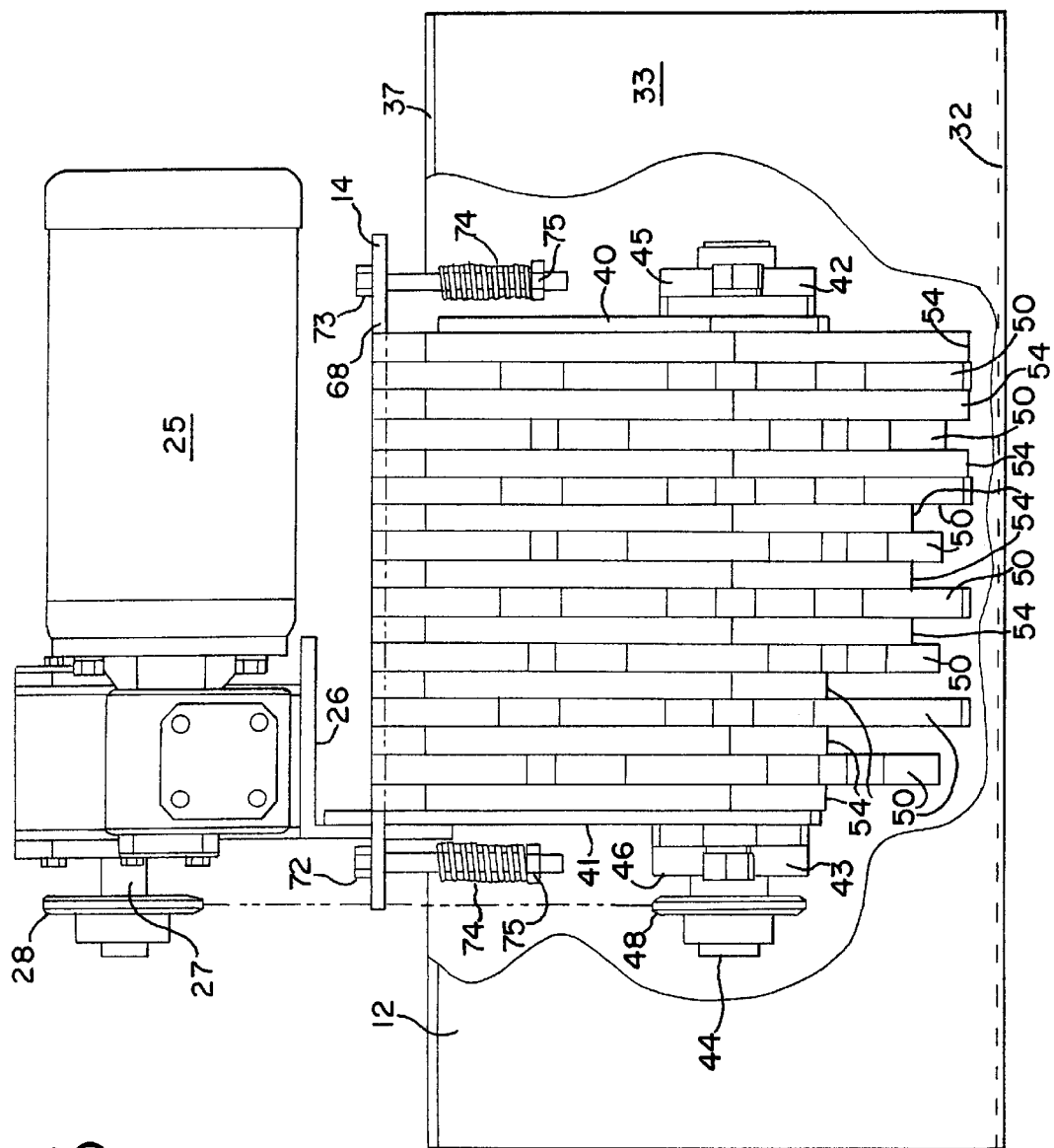
FIG. 3 shows an elevation view of the shredder disposed in the trough shown in FIG. 1 with the trough flange removed.
Figure 4:
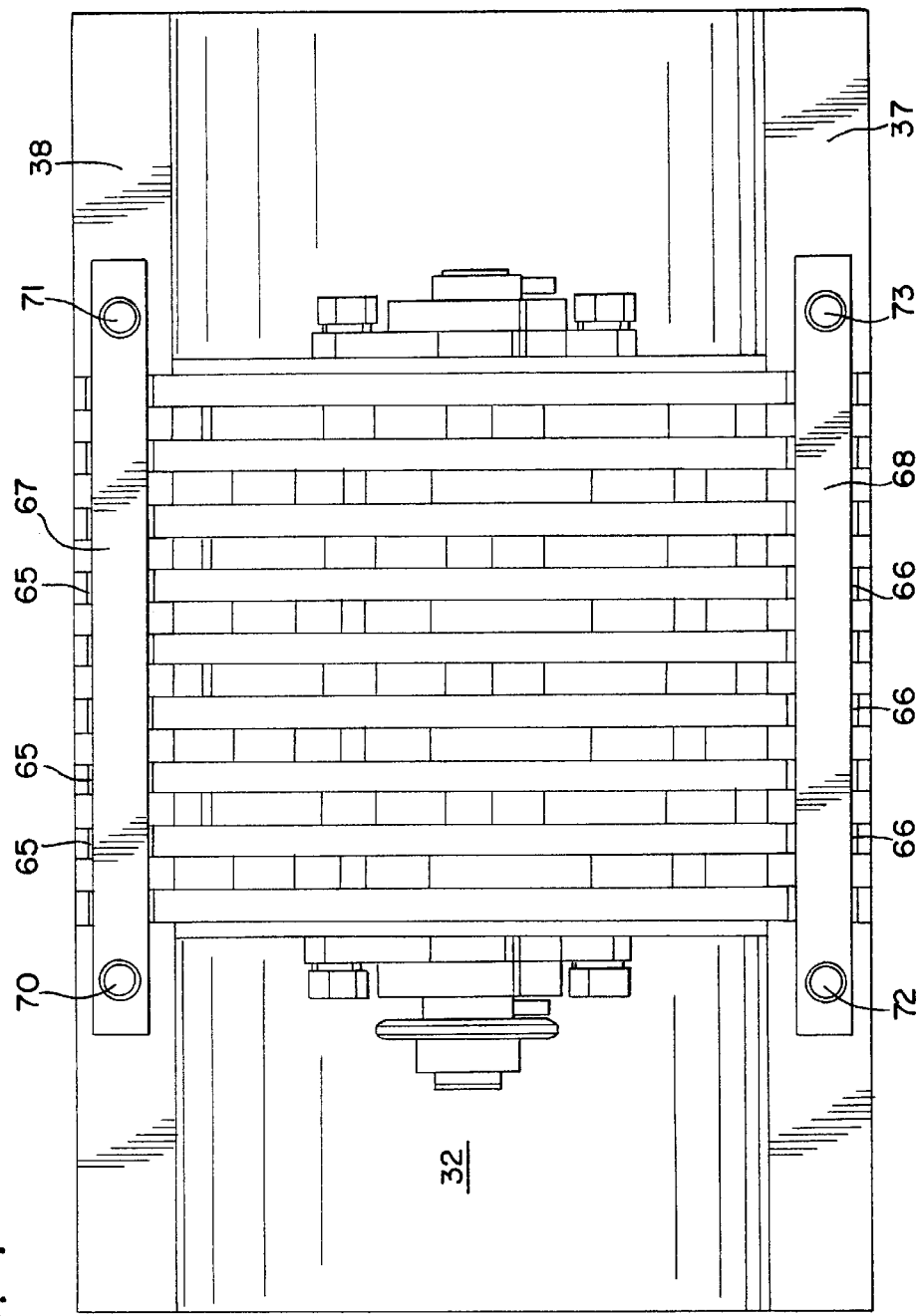
FIG. 4 shows a plan view of the shredder of FIG. 3 with the drive assembly removed.
Figure 5:
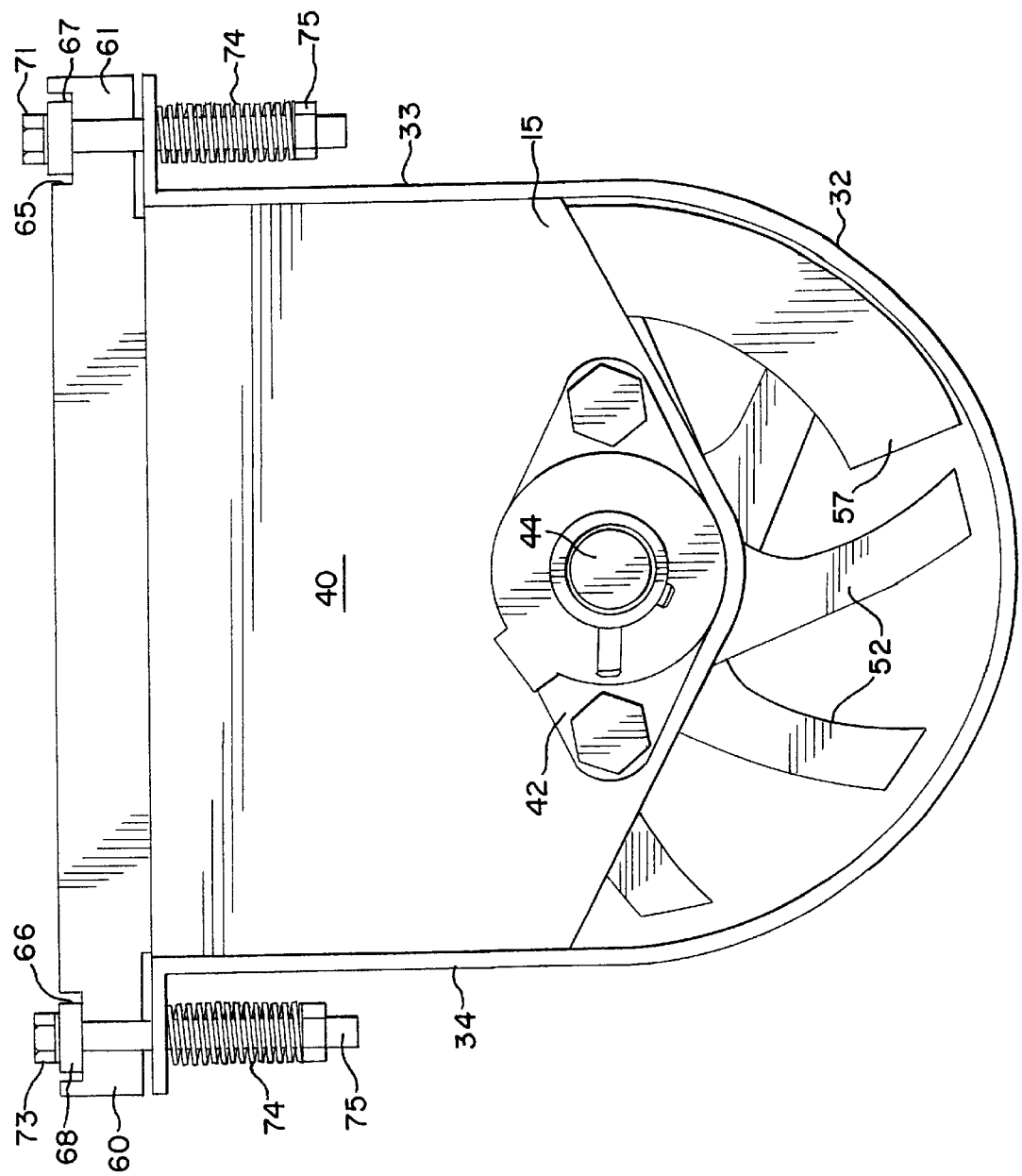
FIG. 5 shows a side elevation view taken along the right side of FIG. 3 with the drive assembly removed.

As illustrated in FIGS. 1, 2 and 3, shredder 14 includes motor 25 mounted on motor bracket 26. Drive shaft 27 extends from motor 25 with drive sprocket 28 mounted on the outboard end of shaft 27. Trough 12 is illustrated as including a U shaped base 32 with two ends terminating as spaced substantially vertical tough side walls 33, 34. Side wall 33 is flanged at the top to provide flange 37 while side wall 34 is flanged at the top to provide flange 38. Shredder housing face plates 40, 41, shown in FIG. 3, serve to enclose shredder sizing members and combs, and preferably are welded at their edges to the side walls of trough 12.

Bearing assembly 42 is seated in an opening in face plate 40 while bearing assembly 43 is seated in an opening in face plate 41. A rotatable drive shaft 44 is seated for rotation in bearings 45, 46 of bearing assemblies 42, 43. Sprocket 48 is attached to one end of drive shaft 44 and is connected to sprocket 28 through a suitable roller chain, not shown.

Drive shaft 44 in this particular shredder assembly embodiment is positioned so that it extends in the direction of the longitudinal axis of trough 12 and is substantially in line with the flow of material and fluid in trough 12.

Referring to FIGS. 2–6, a plurality of spaced sizing members or wheels 50 are fixedly seated on rotatable shaft 44. Each sizing member 50 includes a central hub 51. A plurality of spaced sizing arms 52 extend outwardly from hub 51. As shown in FIG. 2, four sizing arms 52 extend outwardly from hub 51, each arm being positioned at approximately 90° to an adjacent arm.

As shown in FIGS. 2, 3, 5 and 6 adjacent sizing members 50 are located combs 54, each comb being formed of a metal plate. There are three different size comb sets 55, 56, 57 each set preferably comprising three like combs 54. Combs 54 each comprise a substantially flat metal plate. The majority of the combs are sandwiched between adjacent sizing members 50. Each side edge of a comb 54 preferably is contoured to substantially conform to an adjacent inner surface of trough side members 33 and 34. Illustratively, comb 54 includes a comb side edge 58 adapted to abut or be contiguous to the inner surface of trough side member 33. Comb side edge 59 is adapted to abut or be contiguous to the inner surface of trough side member 34.

Combs 54 are each flanged at 60, 61. Comb flange 60 as shown in FIG. 6, is adapted to seat on trough flange 38 while flange 61 is adapted to seat on flange 37.

Each comb 54 includes a pair of fingers 62, 63. Finger 63 depends downward (FIG. 6) the same distance for each comb in each comb set; however, fingers 62 depend downward varying distances for each comb set. Comb fingers 62 extend further downward for the combs of set 57 than the comb fingers for set 56. Similarly, comb fingers 62 of comb set 56 depend further downward than the fingers for comb set 55.

Figure 6:
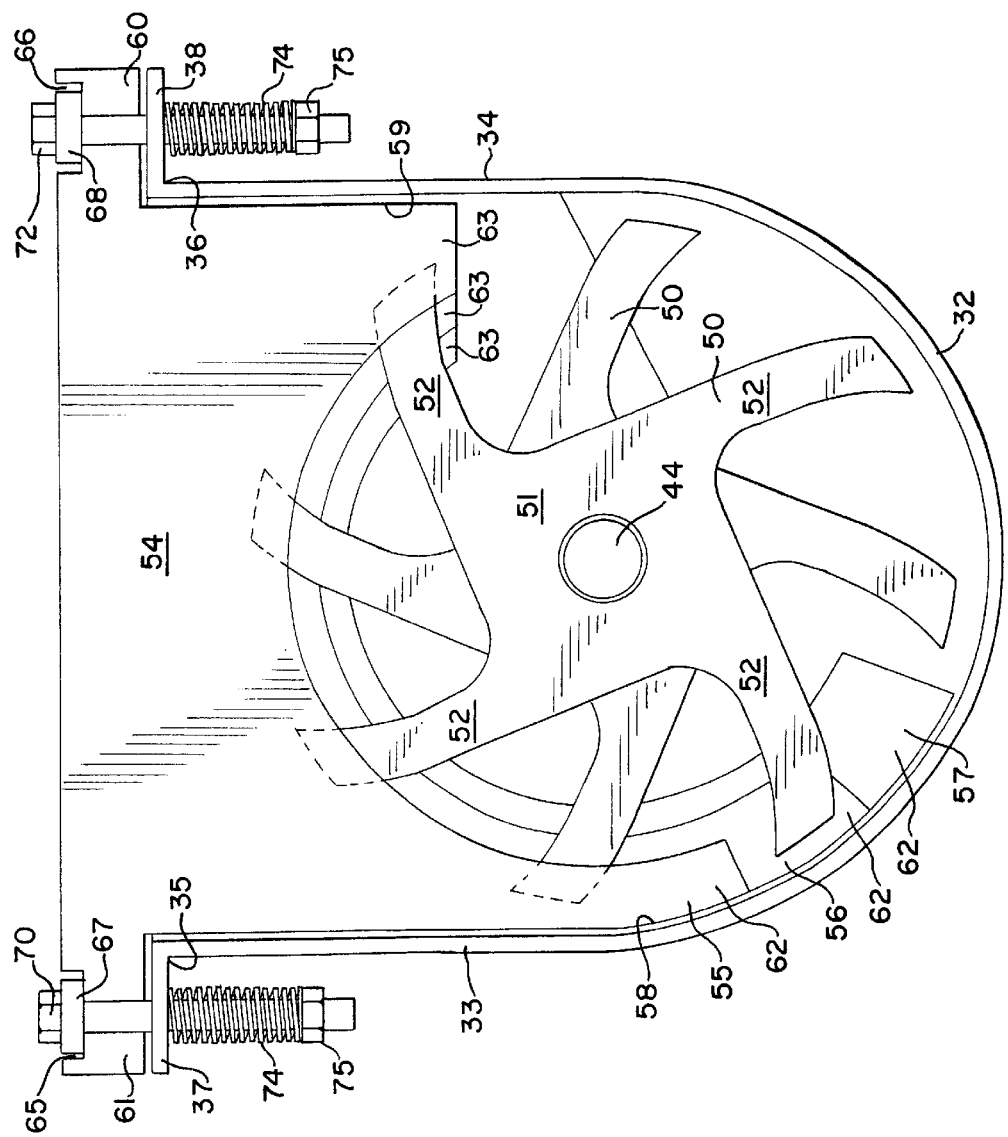
FIG. 6 shows a side elevation view taken along the left side of FIG. 3 with the drive assembly and shredder faceplate removed for illustration.

Each comb 54 as shown in FIGS. 2 and 6, also includes recesses 65, 66 in the top edge of the comb. A pressure plate 67 is adapted to seat in comb recesses 65 while pressure plate 68 is adapted to seat in comb recesses 66. Bolts 70, 71 extend through respective openings located at the opposite ends of pressure plate 67 while Bolts 72, 73 extend through openings located at the opposite ends of pressure plate 68. Each bolt extends downwardly through a corresponding opening in a trough flange 37 or 38. A compression spring 74 is mounted on each bolt and retained in place by a suitable washer and nut assembly 75. When nut assemblies 75 are tightened, combs 54 are maintained in place under spring pressure.

In operation, wet chips, often in the form of relatively long flexible helical strips are discharged from machine center 10 into fluid located in trough 12 of a flume. The wet chips often form into bales of material. As the bales of wet chips and fluid travel along in trough 12, upon actuation of pump in assembly 13, the materials approach shredder 14 whose combs 54 and sizing members 50 are positioned at least partially in the trough liquid directly in the path of the bales and chips. As the bales and chips enter shredder assembly 14, actuation of the shredder causes sizing members 50 to rotate on shaft 44 relative to combs 54 thereby engaging the combs in a scissors like cutting operation to shred the bales and wet chips relatively into small shredded pieces. The shredded wet chips and coolant fluid then continue on in the trough through pump assembly 13 and conduit 16 where they are deposited in collection tank 17. The coolant then is pumped out of tank 17 via pump 20. The coolant passes through conduit 21 and is recycled for use as a machine tool coolant and/or wet chip transfer medium. Simultaneously, the shredded wet chips transfer onto conveyor 22 where the wet chips are transported to a wet chip collection site or a wet chip centrifugal separator system where the wet chips are centrifuged and dry chips are recovered.

While the particular embodiment of the invention has been illustrated showing the shredder combs and sizing fingers disposed in a trough, it is appreciated the shredder could be made in which the shredder contains a separate trough section adapted to seat within a trough. In this embodiment, the shredder and trough section could be assembled at one location and then shipped to a job site when the shredder and trough section would be installed within the trough already in place at the site or the trough section could be joined to other trough sections at the job site.

Similarly, while the trough has been shown to include a preferred U-shaped base, it is appreciated that the trough, if desired, could utilize another shape, e.g., box-like, and the fingers and combs formed to fit properly within such other shape.

Figure 7:
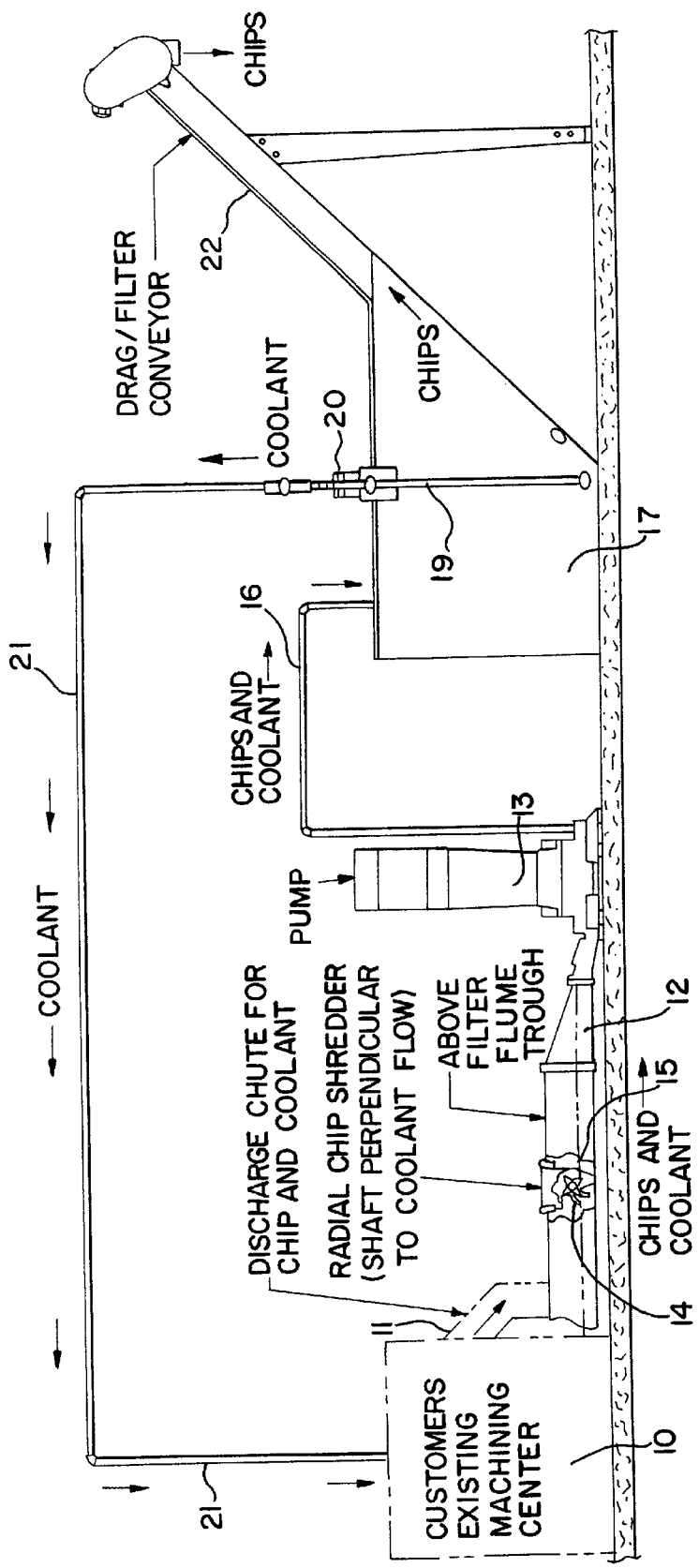
FIG. 7 shows a second embodiment of the shredder assembly disposed in a trough with the shredder shaft positioned in a radial position substantially perpendicular to both the longitudinal axis of the trough and the flow.

FIG. 7 shows a further embodiment of the invention. In this particular embodiment, the shredder assembly is located in a radial position so that rotatable shaft 44 and the sizing members and combs are positioned substantially perpendicular to the fluid flow in the trough, unlike the embodiment of FIG. 1 where shaft 44 is positioned in line with the fluid flow in the trough. In the embodiment of FIG. 7, sizing members 50 are fixed for rotation on shaft 44. Comb members 54 have flange members 60,61 which seat on spaced cross members which extend over the trough. One end of each cross member seats on trough flange 37 which the remaining cross member end seats on trough flange 38. Comb members 54 are disposed between sizing members 50 and resiliently maintained in place on the cross beams utilizing the same type spring assembly as described above with respect to the embodiment of FIG. 1.

The foregoing detailed description is given for clearness of understanding only, and not unnecessary limitation should be understood therefrom as modification within; the scope of the invention will be apparent to those skilled in the art.

What is claimed is:

1. A shredder system for shredding wet chips in a flume, said system comprising:
    a flume comprising a trough and fluid in said trough for conveying wet chips to be shredded to a shredder assembly;
    said trough having a longitudinal axis and adapted to have wet chips and fluid travel in the trough in the direction of the longitudinal axis of the trough;
    said trough having a bottom and a pair of spaced side walls, each side wall joining and extending upward from said trough bottom;
    a shredder assembly comprising:
        a rotatable shaft;
        a plurality of spaced sizing members, each member disposed on and rotatable with said shaft, and at least a portion of each of said sizing members being located within said trough for contact with wet chips and fluid in said trough;
        a plurality of spaced combs, each comb being mounted to said trough and positioned for engagement with said sizing members;
        at least a portion of each comb being disposed in said trough and fluid and adapted to be engageable with at least one said sizing member to cooperate in a shredding action of the wet chips located in the fluid in said trough;
        a shredder assembly drive;
        a connecting assembly for connecting said shredder drive to said shaft whereby upon actuation of said shredder drive, said shaft and shredder sizing members rotate and a shredding action occurs between said sizing members and combs in said trough whereby wet chips located in the fluid within the trough are shredded as they pass through the shredder which is partially located in said trough with shredded wet chips continuing on through said trough following a shredding operation.

2. A shredder system in accordance with claim 1 in which said trough is located above ground.

3. A shredder system in accordance with claim 1 wherein said combs each included a pair of spaced fingers extending into said trough.

4. A shredder system in accordance with claim 3 wherein one of said comb fingers is longer in length than said opposed spaced finger.

5. A shredder system in accordance with claim 1 and further including a plurality of comb sets, each comb set being formed of a plurality of said combs with the combs of one set having at least one finger of a length differing in length than the length of a finger in said remaining comb sets.

6. A shredder system in accordance with claim 1 wherein said combs are spring mounted to said trough.

7. A shredder system in accordance with claim 1 wherein each of said sizing members comprises a hub and a plurality of spaced arms extending outwardly from said hub with at least a portion of said arms extending into the fluid in said trough in the course of a wet chip shredding operation.

8. A shredder system in accordance with claim 1 wherein said sizing members and combs are positioned substantially in line with the flow of wet chips in said trough.

9. A shredder system in accordance with claim 1, wherein said sizing member and combs are positioned substantially perpendicular to the flow of wet chips in said trough.

10. A shredder system in accordance with claim 1, wherein said sizing members and combs are each positioned at least partially in the fluid and wet chips traveling in the trough with the sizing members and comb members being engageable with one another to shred wet chips passing through said shredder assembly.

11. A shredder system in accordance with claim 1 in which said trough is positioned below ground.

12. A shredding system for shredding wet chips in a flume, said system comprising:
    a trough having a length, a bottom and spaced side walls for receiving wet chips and fluid into said trough whereby said wet chips travel in said fluid along the length of said trough;
    a shredder assembly including a plurality of spaced rotatable first members and spaced second members, said first and second members being engageable with one another to cooperate in shredding wet chips located in the fluid traveling in said trough; and,
    said first and second members being positioned in said trough so as to be at least partially in contact with the fluid and wet chips in said trough during a shredding operation.

13. The method of shredding wet chips in which the wet chips travel in a fluid disposed in a trough having a longitudinal axis and the wet chips and fluid travel along in said trough along the longitudinal axis; and
    a shredder assembly within said trough comprising:
        a rotatable shaft;
        a plurality of spaced sizing members each disposed on said shaft and rotatable with said shaft, and at least a portion of each of said sizing members being located within said trough for contact with wet chips and fluid in said trough;
        a plurality of spaced combs, each comb being mounted to said shaft and positioned adjacent to at least one sizing member, and at least a portion of each comb being disposed in said trough and engageable with at least one said sizing member to cooperate in a shredding action;
        a shredder drive;
        a connection assembly for connecting said shredder drive to said shaft;
        the method comprising the steps of:
            passing wet chips and fluid into said trough whereby said fluid and wet chips pass through said trough along the length of said trough;
            actuating said shredder drive to cause said sizing members and combs to cooperate in a shredding action with the wet chips and fluid in said trough to shred wet chips located in the fluid in said trough.

14. The method in accordance with claim 13 and further including the step of shredding wet chips in said trough free of removing said wet chips from trough prior to or during a shredding operation.

15. For use with a trough having a bottom and spaced side walls into which wet chips are conveyed in fluid located in said trough, a shredder assembly comprising:
- a plurality of spaced rotatable first members and spaced second members, said first and second members being engageable with one another to cooperate in shredding wet chips traveling in the fluid in said trough; and,
- said first and second members being positioned in said trough to be at least partially in contact with wet chips located in the fluid in said trough during a shredding operation; and,
- a drive assembly for causing said first and second members to cooperate with one another to shred wet chips while said wet chips are in the fluid in said trough.

16. The method of shredding wet chips disposed in a fluid in a trough which comprises a bottom and spaced side walls, said trough being adapted to receive and transport the wet chips and fluid, and having a shredder assembly associated with said trough, said assembly comprising:
- a rotatable shaft;
- a plurality of spaced first members each disposed on said shaft and rotatable with said shaft;
- a plurality of spaced second members, at least a portion of each of said first and second members being disposed in said trough for contact with said wet chips and fluid, and said first and second members being engageable with each other to shred wet chips;
- a drive assembly for causing said first and second members to cooperate with one another to shred wet chips;

said method comprising the steps of:
- passing wet chips and fluid in said trough whereby wet chips and fluid pass through said trough along the length of said trough to the shredder assembly;
- activating said drive assembly to cause said first members to cooperate with said second members to shred wet chips in said fluid while said wet chips are in said trough.

* * * * *